(12) United States Patent
Jing

(10) Patent No.: US 9,423,636 B2
(45) Date of Patent: Aug. 23, 2016

(54) HIGH TEMPERATURE CURING OVEN

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventor: Yangkun Jing, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 176 days.

(21) Appl. No.: 14/119,318

(22) PCT Filed: Dec. 18, 2012

(86) PCT No.: PCT/CN2012/086882
§ 371 (c)(1),
(2) Date: Nov. 21, 2013

(87) PCT Pub. No.: WO2014/012335
PCT Pub. Date: Jan. 23, 2014

(65) Prior Publication Data
US 2014/0158675 A1  Jun. 12, 2014

(30) Foreign Application Priority Data
Jul. 16, 2012 (CN) .......................... 2012 1 0245803

(51) Int. Cl.
*F27B 5/18* (2006.01)
*F27D 11/02* (2006.01)
(Continued)

(52) U.S. Cl.
CPC .............. *G02F 1/1303* (2013.01); *F26B 23/06* (2013.01); *F26B 25/06* (2013.01); *F27B 5/18* (2013.01); *G01J 5/0044* (2013.01); *G01J 5/0066* (2013.01); *G01J 5/047* (2013.01); *G01J 5/084* (2013.01); *G01K 13/00* (2013.01); *F27D 11/02* (2013.01);
(Continued)

(58) Field of Classification Search
None
See application file for complete search history.

(56) References Cited

U.S. PATENT DOCUMENTS 6,310,328 B1 * 10/2001 Gat .................... H01L 21/67115
                                                                  118/725
6,506,994 B2 * 1/2003 Wang .................. C23C 16/0209
                                                                  118/728

(Continued)

FOREIGN PATENT DOCUMENTS

CN      1051939 A     6/1991
CN      101118189 A   2/2008
(Continued)

OTHER PUBLICATIONS

International Preliminary Report on Patentability dated Jan. 20, 2015; PCT/CN2012/086882.
(Continued)

*Primary Examiner* — Joseph M Pelham
(74) *Attorney, Agent, or Firm* — Ladas & Parry LLP

(57) ABSTRACT

Embodiments of the invention provide a high temperature curing oven, comprising: a heating cavity a heater and a temperature monitor system. The heater includes a plurality of heating modules that can be controlled independently. The temperature monitor system includes: a thermocouple; an infrared monitor device; a signal processing module; and an executing module.

8 Claims, 2 Drawing Sheets

(51) Int. Cl.
*F27D 19/00* (2006.01)
*F26B 23/06* (2006.01)
*F26B 25/06* (2006.01)
*G02F 1/13* (2006.01)
*G01K 13/00* (2006.01)
*G01J 5/00* (2006.01)
*G01J 5/04* (2006.01)
*G01J 5/08* (2006.01)

(52) U.S. Cl.
CPC . *F27D 2019/0003* (2013.01); *G01J 2005/0077* (2013.01)

(56) References Cited

U.S. PATENT DOCUMENTS

| | | | | |
|---|---|---|---|---|
| 6,610,967 | B2* | 8/2003 | Gat | H01L 21/67115 118/724 |
| 6,727,474 | B2* | 4/2004 | Gat | H01L 21/67115 219/411 |
| 7,138,607 | B2* | 11/2006 | Wang | H01L 21/324 219/390 |
| 2001/0002668 | A1* | 6/2001 | Gat | H01L 21/67115 219/390 |
| 2002/0005400 | A1* | 1/2002 | Gat | H01L 21/67115 219/390 |
| 2003/0049372 | A1* | 3/2003 | Cook | C23C 16/24 118/724 |
| 2004/0226933 | A1* | 11/2004 | Wang | H01L 21/324 219/390 |
| 2009/0187268 | A1* | 7/2009 | Sugishita | G05B 5/01 700/121 |
| 2012/0008925 | A1 | 1/2012 | Yoshimoto et al. | |
| 2012/0125539 | A1* | 5/2012 | He | G02F 1/1303 156/378 |

FOREIGN PATENT DOCUMENTS

| | | |
|---|---|---|
| CN | 101382478 A | 3/2009 |
| CN | 101542254 A | 9/2009 |
| CN | 102241095 A | 11/2011 |
| CN | 102301196 A | 12/2011 |
| CN | 102784747 A | 11/2012 |
| CN | 202591092 U | 12/2012 |
| JP | 2007-121047 A | 5/2007 |
| TW | 201135198 A | 10/2011 |

OTHER PUBLICATIONS

First Chinese Office Action dated Jul. 31, 2013; Appln. No. 201210245803.4.
Second Chinese Office Action dated Apr. 17, 2014; Appln. No. 201210245803.4.
International Search Report dated Apr. 25, 2013; PCT/CN2012/086882.
International Search Report mailed Apr. 25, 2013; PCT/CN2012/086882.

* cited by examiner

HIGH TEMPERATURE CURING OVEN

TECHNICAL FIELD

Embodiments of the invention relate to a high temperature curing oven.

BACKGROUND

High temperature curing oven is a high temperature curing apparatus for curing the sealant between the bonded substrates of the liquid crystal device during the process of one drop filling (ODF).

FIG. 1 is a schematic view showing a conventional high temperature curing oven having a heater and a thermocouple.

As shown in FIG. 1, the conventional high temperature curing oven includes a heating cavity 1, a heater 2 for heating the heating cavity 1 and a temperature monitor system for monitoring a curing temperature inside the heating cavity 1.

The temperature monitor system in the conventional high temperature curing oven is shown in FIG. 2. FIG. 2 shows the operation principle of the temperature monitor system in the conventional high temperature curing oven.

The temperature monitor system in the conventional high temperature curing oven includes a thermocouple 3, a signal processing module using a Programmable Logic Controller (PLC) as a calculating module and an executing module. The thermocouple 3 monitors the curing temperature information inside the heating cavity 1 and transfers the obtained curing temperature information signal to the PLC, the PLC compares the curing temperature information monitored by the thermocouple 3 and predetermined temperature information. When the curing temperature information monitored by the thermocouple 3 appears abnormal, the PLC generates an executive command and transfers the executive command signal to the executing module, and the executing module adjusts the heater 2 according to the executive command. In this way, control and adjustment of the curing temperature inside the heating cavity 1 is realized.

However, the thermocouple 3 can only monitor the environment temperature inside the heating cavity 1 of the high temperature curing oven, but cannot monitor the temperature of the substrate surface. In addition, the thermocouple 3 has a certain delay on sensing the temperature change, which is bad for precisely monitoring the curing temperature of the substrate in the heating cavity 1 of the high temperature curing oven.

Therefore, it is necessary to provide a high temperature curing oven capable of precisely monitoring the curing temperature of the substrate inside the heating cavity.

SUMMARY

Embodiments of the invention provide a high temperature curing oven. The high temperature curing oven comprises: a heating cavity, a heater and a temperature monitor system for monitoring a curing temperature inside the heating cavity. The heater includes a plurality of heating modules that can be controlled independently. The temperature monitor system comprises:

at least one thermocouple for monitoring a temperature information of an inner environment of the heating cavity;

an infrared monitor device for monitoring a surface temperature information of each layer of substrates inside the heating cavity and generating a temperature signal according to the surface temperature information;

a signal processing module signally connecting to the thermocouple and the infrared monitor device, and generating an executive command when judging that there exists a substrate with abnormal curing temperature which has an excessively high temperature point and/or an excessively low temperature point according to the temperature information from the thermocouple and the temperature signal from the infrared monitor device; and an executing module signally connecting to the signal processing module, and adjusting a heating power of the heating module corresponding to the substrate with abnormal curing temperature in the heater according to the executive command generated by the signal processing module.

For example, the heating modules correspond to the substrates disposed in the heating cavity in a one-to-one manner.

For example, each of the heating modules includes at least one resistance heating wire, each of which can be controlled independently.

For example, the infrared monitor device comprises: at least one infrared camera tube, which is disposed inside the heating cavity and monitors the surface temperature information of each layer of substrates inside the heating cavity; a sliding rail, which is disposed on a side wall of the heating cavity; a driving device, which is capable of driving the infrared camera tube to slide along the sliding rail; and an infrared signal receiving-and-processing device, which signally connects to each infrared camera tube and generates the temperature signal according to the surface temperature information. The infrared signal receiving-and-processing device signally connects to the signal processing module.

For example, the infrared signal receiving-and-processing device further generates an infrared imaging signal according to the surface temperature information monitored by the infrared camera tube, the infrared monitor device further includes a display device, the display device signally connects to the infrared signal receiving-and-processing device and generates an image according to the infrared imaging signal generated by the infrared signal receiving-and-processing device.

For example, the infrared camera tube is one infrared camera tube, which reciprocally slides along the sliding rail between a substrate in a highest layer and a substrate in a lowest layer inside the heating cavity.

For example, there exist a plurality of the infrared camera tubes, each of which corresponds to one layer of substrate inside the heating cavity, the sliding rail is a horizontal sliding rail which corresponds to the infrared camera tube in a one-to-one manner, and each infrared camera tube is capable of sliding reciprocally along its corresponding horizontal sliding rail.

For example, the signal processing module is a programmable logic controller (PLC).

For example, the executing module includes a plurality of solid state relays and controls a switching of each of the solid state relays according to the executive command from the signal processing module so as to adjust the heating power of the heating module corresponding to the substrate with abnormal curing temperature in the heater.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
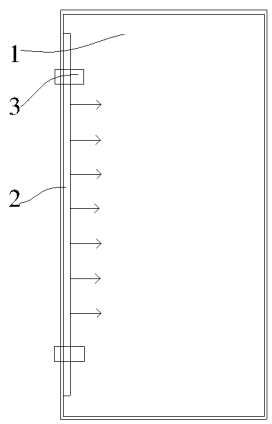
FIG. 1 is a schematic view illustrating a conventional high temperature curing oven.
Figure 2:
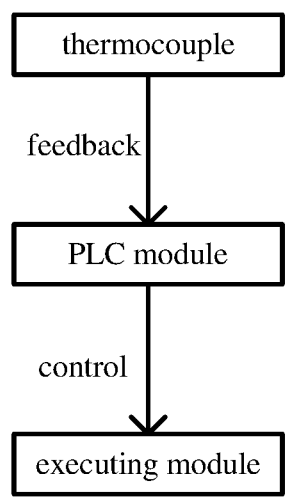
FIG. 2 is a schematic diagram illustrating an operation principle of a temperature monitor system of the conventional high temperature curing oven.
Figure 3:
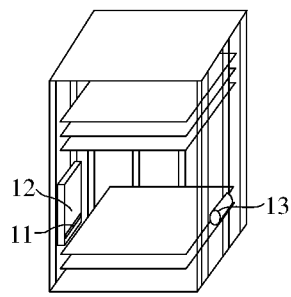
FIG. 3 is a schematic view illustrating an inside structure of a heating cavity of a high temperature curing oven according to an embodiment of the invention.
Figure 4:
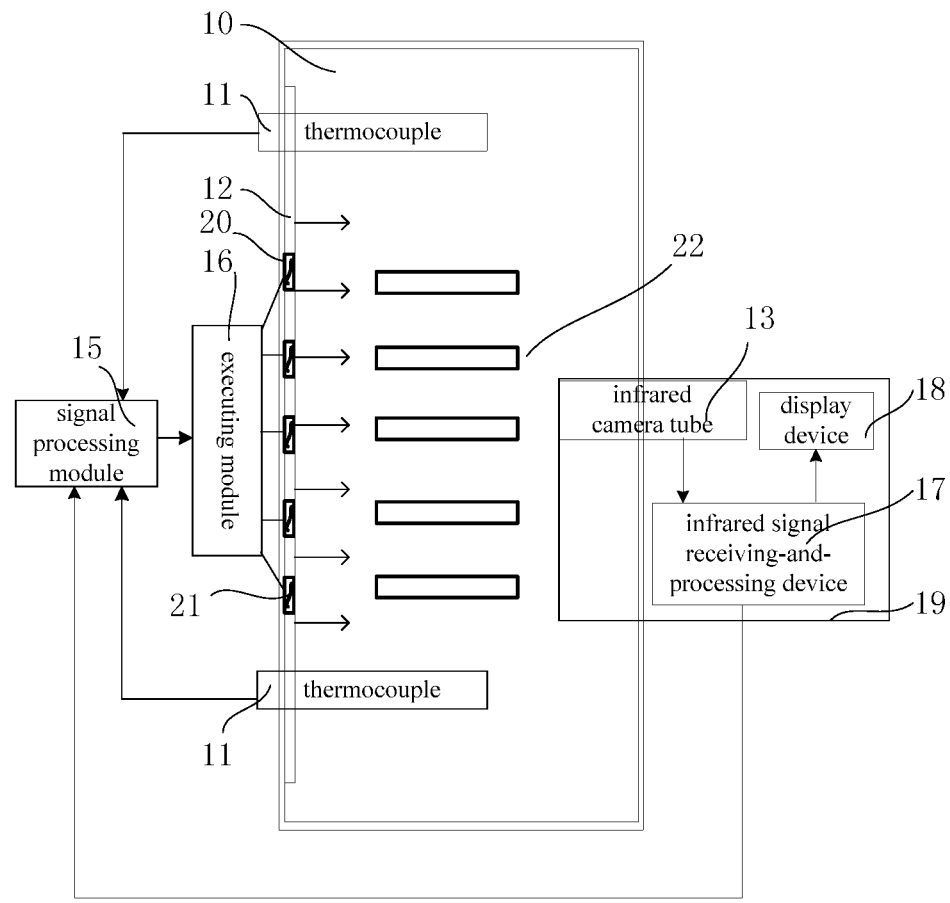
FIG. 4 is a schematic view illustrating an operation principle of a temperature monitor system of a high temperature curing oven according to an embodiment of the invention.

FIG. 3 is a schematic view illustrating an inside structure of a heating cavity of a high temperature curing oven according to an embodiment of the invention, and FIG. 4 is a schematic view illustrating an operation principle of a temperature monitor system of a high temperature curing oven according to an embodiment of the invention.

Referring to FIG. 3 and FIG. 4, the high temperature curing oven according to the embodiment of the invention includes a heating cavity 10, a heater 12 for heating the heating cavity 10 and a temperature monitor system for monitoring a curing temperature inside the heating cavity 10. The heater 12 includes a plurality of heating modules 20 that can be controlled independently.

The temperature monitor system comprises: at least one thermocouple 11 for monitoring the temperature information of an inner environment of the heating cavity 10; an infrared monitor device 19 for monitoring the surface temperature information of each layer of substrates 22 inside the heating cavity 10 and generating a temperature signal according to the surface temperature information; a signal processing module 15 and an executing module 16. The signal processing module 15 signally connects to the thermocouple 11 and the infrared monitor device 19, and generates an executive command when judges that there exists a substrate with abnormal curing temperature which has an excessively high temperature point and/or an excessively low temperature point according to the temperature information from the thermocouple 11 and the temperature signal from the infrared monitor device 19. The executing module 16 signally connects to the signal processing module 15, and adjusts the heating power of the heating module corresponding to the substrate with abnormal curing temperature in the heater 12 according to the executive command generated by the signal processing module 15.

In the temperature monitor system of the high temperature curing oven according to the embodiment of the invention, the thermocouple 11 monitors the curing temperature of the inner environment of the heating cavity 10 and transfers the curing temperature information signal of the inner environment of the heating cavity 10 to the signal processing module 15. At the same time, the infrared monitor device 19 monitors the surface temperature of the substrate being cured inside the heating cavity 11, generates the temperature signal according to the surface temperature information of the substrate and transfers the temperature signal to the signal processing module 15. The signal processing module 15 judges whether the curing temperature is abnormal according to the curing temperature information from the thermocouple 11 and the temperature signal from the infrared monitor device 19. If the curing temperature is abnormal, the signal processing module 15 generates the corresponding executive command according to the abnormal curing temperature, and transfers the executive command signal to the executing module 16. The executing module 16 adjusts the heating power of the heating module which the substrate having abnormal temperature corresponds to in the heater 12 according to the executive command and accordingly adjusts the heat output of the heating module which the substrate having abnormal temperature corresponds to in the heater 12. In this way, the curing temperature inside the heating cavity 10 of the high temperature curing oven can be controlled.

The infrared monitor device 19 monitors the surface temperature of the substrate being cured under high temperature inside the heating cavity 11, and the thermocouple 11 monitors the high curing temperature of the inner environment of the heating cavity 10. In addition, the infrared monitor device 19 has an excellent sensitivity which can reduce the influence causing by the time delay of the thermocouple 11.

The high curing oven in the embodiment monitors the temperature change of the substrate surface inside the heating cavity 10 directly on real time by the infrared monitor device 19 so as to achieve the control of the temperature. In this way, the precision of the temperature control can be enhanced greatly.

Therefore, the temperature monitor system of the high temperature curing oven according to the embodiment of the invention can monitor the curing temperature of the inner environment of the heating cavity 10, and at the same time, it can monitor the surface temperature of the each layer of substrates inside the heating cavity 10. Therefore, the heating time for each layer of substrates can be controlled reasonably by the high temperature curing oven, and the precision for monitoring the curing temperature of the heating cavity 10 can be enhanced.

In addition, in order to further increase the precision for controlling the curing temperature inside the heating cavity 10, for example, the heating modules may correspond to the substrates disposed in the heating cavity 10 in a one-to-one manner.

In addition, each of the heating modules may further include at least one resistance heating wire 21, each of which can be controlled independently.

According to the embodiment of the invention, the infrared monitor device 19 in the temperature monitor system of the high temperature curing oven includes: at least one infrared camera tube 13, which is disposed inside the heating cavity 10 and monitors the surface temperature information of each layer of substrates inside the heating cavity 10; a sliding rail, which is disposed in the heating cavity 10; a driving device, which is capable of driving the infrared camera tube 13 to slide along the sliding rail; an infrared signal receiving-and-processing device 17, which signally connects to each infrared camera tube 13 and generates the temperature signal according to the surface temperature information of the substrate. In addition, the infrared signal receiving-and-processing device 17 signally connects to the signal processing module 15.

In the above infrared monitor device, by using the principle that the substrates with different temperatures emit different infrared light, the infrared camera tube 13 monitors the infrared light emitted from the surface of the substrate inside the heating cavity 10 of the high temperature curing oven, and thus the monitoring of the surface temperature of the substrate is achieved. At the same time, the infrared camera tube 13 is capable of sliding inside the heating cavity 10 along the sliding rail under the driving of the driving device, and thus the monitoring of each layer of substrates which are heating and curing inside the heating cavity 10 is achieved. In addition, the infrared camera tube 13 transfers the monitored infrared light information signal from the substrate surface to the infrared signal receiving-and-processing device 17, the infrared signal receiving-and-processing device 17 generates the temperature signal and transfers the temperature signal to the signal processing module 15.

Therefore, the above infrared monitor device 19 can monitor the surface temperature of each layer of substrates inside the heating cavity 10 and have a good monitoring precision.

In addition, according to the embodiment of the invention, in order to visualize the monitor result of the infrared camera tube, the infrared signal receiving-and-processing device 17 may further generate an infrared imaging signal according to the temperature signal of the substrate surface monitored by the infrared camera tube 13. In addition, the infrared monitor device 19 may further include a display device 18; the display device 18 signally connects to the infrared signal receiving-and-processing device hand generates an image according to the infrared imaging signal generated by the infrared signal receiving-and-processing device 17.

According to the infrared imaging signal, the display device 18 generates the heat image on which different colors represent different temperatures of the monitored substrate surface. The temperature curve of the infrared signal receiving-and-processing device 17 and the heat image of the display device 18 synchronize with each other. The operator finds out the abnormal temperature point according to the temperature distribution of the heat image, so that he can comprehensively understand the curing condition of the substrate and thereby precisely control the curing process to increase the product yield.

In addition, the above infrared monitor device 19 can further simplify the installation and adjustment process of the high temperature curing oven. During the installation and adjustment process of the conventional high temperature curing oven, it needs to prepare a thermocouple glass, adjust each layer inside the heating cavity 10 of the high temperature curing oven and make a temperature curve for each layer of substrates, and thus a lot of man-hours are wasted. However, according to the embodiment of the invention, it can directly generate the heat image through the display device 18 to perform the adjustment. Thus, a lot of man-hours can be saved, the installation and adjustment process of the high temperature curing oven can greatly simplified and the temperature of the substrate can be monitored real-time during the production process.

In addition, upon performing the maintenance of the high temperature curing oven, it can easily adjust the temperature and does not need to stop the production line. However, upon performing the maintenance of the conventional high temperature curing oven, it needs to make the temperature curve for each layer of substrates inside the heating cavity as same as installing the conventional high temperature curing oven, and thus a lot of time is wasted. According to the embodiment of the invention, the temperature can be adjusted through the infrared camera tube 13 and the display device 18 without stopping the production line.

According to the embodiment of the invention, the infrared camera tube 13 may be one infrared camera tube 13, which reciprocally slides along the sliding rail between the substrate in the highest layer and the substrate in the lowest layer inside the heating cavity 10.

Figure 5:
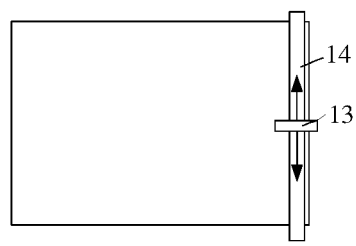
FIG. 5 is a schematic view illustrating a disposition of an infrared camera tube in the high temperature curing oven according to an embodiment of the invention.

In order to monitor the temperature of each layer of substrates in time, there nay be provided a plurality of the infrared camera tubes 13, each of which corresponds to one layer of substrate inside the heating cavity 10. The sliding rail is a horizontal sliding rail 14 which corresponds to the infrared camera tube 13 in a one-to-one manner, and each infrared camera tube 13 is of capable sliding reciprocally along its corresponding horizontal sliding rail 14, as is shown in FIG. 5.

According to the embodiment of the invention, the signal processing module 15 may be a PLC. The PLC adopts a programmable memory device for storing programs therein, executes the commands facing the user such as logical calculation, sequence control, timing, counting, calculation operation and the like, and controls each kind of mechanical processes or production processes by the inputting/outputting in digital form or analog form. The PLC is a mature technology and can work reliably.

In addition, the executing module 16 may include a plurality of solid state relays (SSRs). The executing module 16 controls the switching of each SSR according to the executive command from the PLC so as to adjust the heating power of the heating module in the heater that corresponds to the substrate with the abnormal temperature. The SSR is a non-contact switch completely composed of electronic elements, and has advantages of high reliability, long life time, low noise, rapid switch speed, strong anti-inference ability, strong shock resistance, strong impact resistance, strong moisture resistance, strong corrosion resistance, good compatibility with the Transistor-Transistor Logic (TTL) and the Complementary Metal Oxide Semiconductor (CMOS) and other logical circuits. The SSR would not generate electric spark when it is turned on or turned off.

In the temperature monitor system of the high temperature curing oven according to the embodiment of the invention, the thermocouple monitors the temperature information of the inner environment of the heating cavity and transfers the monitored temperature information signal of the inner environment of the heating cavity to the signal processing module. At the same time, the infrared monitor device monitors the surface temperature of each layer of substrates being cured inside the heating cavity, generates the temperature signal according to the surface temperature information of the substrate and transfers the temperature signal to the signal processing module. The signal processing module judges whether there exists a substrate having an excessively high temperature point and/or an excessively low temperature point according to the temperature information from the thermocouple and the temperature signal from the infrared monitor device. If there exists the substrate having the excessively high temperature point and/or the excessively low temperature point, the signal processing module generates the corresponding executive command according to the abnormal temperature, and transfers the executive command signal to the executing module. The executing module adjusts the heating power of the heating module that the substrate having abnormal temperature corresponds to in the heater according to the executive command so as to reduce the temperature at the excessively high temperature point and/or increase the temperature at the excessively low temperature point, and thus the output of the heater is adjusted. Accordingly, the uniformity of the curing temperature of the substrate can be improved.

The infrared monitor device monitors the surface temperature of the substrate being cured under high temperature inside the heating cavity, and the thermocouple monitors the high curing temperature of the inner environment of the heating cavity. In addition, the infrared monitor device has an excellent sensitivity which can reduce the influence causing by the time delay of the thermocouple.

The temperature monitor system in the high temperature curing oven according to the embodiment of the invention can both monitor the curing temperature of the inner environment of the heating cavity and monitor the surface temperature of the substrate inside the heating cavity, and in this case, the precision for monitoring the curing temperature of the substrate inside the heating cavity can be enhanced. The foregoing are only preferable embodiments of the invention. It is to be noted that, those with ordinary skills in the art may make various modifications and changes without departing the technical principle of the invention, and these modifications and changes should be deemed to be within the protection scope of the invention.

What is claimed is:

1. A high temperature curing oven for heating a plurality of substrates, comprising: a heating cavity, a heater and a temperature monitor system for monitoring a curing temperature inside the heating cavity, wherein:
    the heater includes a plurality of heating modules that can be controlled independently,
    the temperature monitor system comprises:
    at least one thermocouple for monitoring a temperature information of an inner environment of the heating cavity;
    an infrared monitor device for monitoring a surface temperature information of each layer of substrates inside the heating cavity and generating a temperature signal according to the surface temperature information;
    a signal processing module signally connecting to the thermocouple and the infrared monitor device, and generating an executive command when judging that there exists a substrate with abnormal curing temperature which has an excessively high temperature point and/or an excessively low temperature point according to the temperature information from the thermocouple and the temperature signal from the infrared monitor device; and
    an executing module signally connecting to the signal processing module, and adjusting a heating power of the heating module corresponding to the substrate with abnormal curing temperature in the heater according to the executive command generated by the signal processing module, wherein the infrared monitor device comprises:
    at least one infrared camera tube, which is disposed inside the heating cavity and monitors the surface temperature information of each layer of substrates inside the heating cavity;
    a sliding rail, which is disposed on a side wall of the heating cavity;
    a driving device, which is capable of driving the infrared camera tube to slide along the sliding rail; and
    an infrared signal receiving-and-processing device, which signally connects to each infrared camera tube and generates the temperature signal according to the surface temperature information,
    the infrared signal receiving-and-processing device signally connects to the signal processing module.

2. The high temperature curing oven according to claim 1, wherein the heating modules correspond to the substrates disposed in the heating cavity in a one-to-one manner.

3. The high temperature curing oven according to claim 1, wherein each of the heating modules includes at least one resistance heating wire, each of which can be controlled independently.

4. The high temperature curing oven according to claim 1, wherein
    the infrared signal receiving-and-processing device further generates an infrared imaging signal according to the surface temperature information monitored by the infrared camera tube,
    the infrared monitor device further includes a display device, the display device signally connects to the infrared signal receiving-and-processing device and generates an image according to the infrared imaging signal generated by the infrared signal receiving-and-processing device.

5. The high temperature curing oven according to claim 1, wherein the infrared camera tube is one infrared camera tube, which reciprocally slides along the sliding rail between a substrate in a highest layer and a substrate in a lowest layer inside the heating cavity.

6. The high temperature curing oven according to claim 1, wherein there exist a plurality of the infrared camera tubes, each of which corresponds to one layer of substrate inside the heating cavity,
    the sliding rail is a horizontal slid rail which corresponds to the infrared camera tube in a one-to-one manner, and each infrared camera tube is capable of sliding reciprocally along its corresponding horizontal sliding rail.

7. The high temperature curing oven according to claim 1, wherein the signal processing module is a programmable logic controller (PLC).

8. The high temperature curing oven according to claim 1, wherein the executing module includes a plurality of solid state relays and controls a switching of each of the solid state relays according to the executive command from the signal processing module so as to adjust the heating power of the heating module corresponding to the substrate with abnormal curing temperature in the heater.

* * * * *